(12) United States Patent
Speicher et al.

(10) Patent No.: US 11,786,350 B2
(45) Date of Patent: *Oct. 17, 2023

(54) ORAL CARE AGENT DISPENSING SYSTEM

(71) Applicant: Colgate-Palmolive Company, New York, NY (US)

(72) Inventors: Erin Speicher, Hoboken, NJ (US); Leighton Davies-Smith, Lebanon, NJ (US)

(73) Assignee: Colgate-Palmolive Company, New York, NY (US)

( * ) Notice: Subject to any disclaimer, the term of this patent is extended or adjusted under 35 U.S.C. 154(b) by 141 days.

This patent is subject to a terminal disclaimer.

(21) Appl. No.: 17/470,747

(22) Filed: Sep. 9, 2021

(65) Prior Publication Data

US 2021/0401560 A1 Dec. 30, 2021

Related U.S. Application Data

(63) Continuation of application No. 16/221,534, filed on Dec. 16, 2018, now Pat. No. 11,141,253.

(51) Int. Cl.
*A61C 19/06* (2006.01)
*A46B 11/00* (2006.01)

(52) U.S. Cl.
CPC ........ *A61C 19/066* (2013.01); *A46B 11/0055* (2013.01); *A46B 11/0075* (2013.01); *A46B 2200/10* (2013.01)

(58) Field of Classification Search
CPC ... A61C 19/066; A61C 17/221; A61C 17/227; A46B 11/0055; A46B 11/0075
See application file for complete search history.

(56) References Cited

U.S. PATENT DOCUMENTS

| 5,921,251 | A | 7/1999 | Joshi |
| 7,775,795 | B2 | 8/2010 | Khawaled et al. |
| 8,156,602 | B2 | 4/2012 | Jimenez et al. |
| 9,707,052 | B2 | 7/2017 | Tapocik |
| 10,245,129 | B2 | 4/2019 | Nagayama et al. |
| 11,116,617 | B2 * | 9/2021 | Speicher ............ A46B 15/0022 |
| 11,141,253 | B2 * | 10/2021 | Speicher ............ A46B 11/0055 |

(Continued)

FOREIGN PATENT DOCUMENTS

| EP | 3237654 | 11/2017 | |
| WO | WO-2016102201 A1 * | 6/2016 | ........... A46B 11/002 |
| WO | 2016/123110 | 8/2016 | |

*Primary Examiner* — Ralph A Lewis

(57) ABSTRACT

An oral care implement for dispensing an oral care agent includes a housing, reservoir therein containing an oral care fluid, and an electrical circuit comprising first and second electrodes connected to an onboard power source. Each electrode is in contact with the oral care fluid in the housing. An actuator, operably coupled to the power source, is configured to both selectively energize the circuit and activate dispensing of the oral care fluid. An electrical charge is applied to the oral care fluid by activating the actuator when dispensing the oral care fluid. When the fluid comprises a peroxide based tooth whitening agent, the dispensed fluid pH is increased by the electrical charge which improves the efficacy of the whitener. In one embodiment, the implement is a modular system including a powered base unit and one or more interchangeable cartridges each having a reservoir containing an oral care fluid.

20 Claims, 16 Drawing Sheets

(56) References Cited

U.S. PATENT DOCUMENTS

| | | |
|---|---|---|
| 2008/0274066 A1 | 11/2008 | Montgomery |
| 2016/0338814 A1 | 11/2016 | Cho et al. |
| 2019/0374018 A1 | 12/2019 | Johansson et al. |
| 2020/0188076 A1 | 6/2020 | Speicher et al. |

\* cited by examiner

ORAL CARE AGENT DISPENSING SYSTEM

CROSS-REFERENCE TO RELATED APPLICATION

This application is a continuation of U.S. Nonprovisional patent application Ser. No. 16/221,534, filed Dec. 16, 2018, the contents of which are hereby incorporated herein by reference in their entirety.

BACKGROUND

The present invention generally relates oral care systems, and more particularly to an oral care system including an implement or device for dispensing an oral care fluid.

Various implements or devices are used for storing and dispensing oral care agents or fluids such as tooth whitening formulations. It is known that the efficacy of one such formulation used in hydrogen peroxide bleaching is directly proportional to the increase in its pH. However, in order to maximize shelf-life of hydrogen peroxide-containing formulations, the pH is often set to a lower level than desired, closer to pH 5.5 for example, at which the peroxide is more stable, but where the whitening efficacy is not optimal. In other oral care agent formulations for different oral care purposes (e.g. sensitivity, anti-bacterial, etc.), increased ion concentrations and activity in the product enhances treatment efficacy.

Improvements in oral care agent storage and dispensing are desired.

BRIEF SUMMARY

The present application provides an oral care system comprising a hand-held oral care implement for dispensing an oral care agent. In one example, the oral care agent may be a tooth whitening fluid comprising hydrogen peroxide and water based mixture. The whitening fluid may be in liquid or gel form in some embodiments. In one non-limiting implementation, the oral care implement may be configured as a portable tooth whitening pen or dispenser comprising an onboard electric power system and electrical circuit operable to increase the local pH of the hydrogen peroxide containing whitening fluid at the dispensing end of the dispenser prior to delivery to the user. The circuit is configured to electrochemically activate the whitening fluid via activating an actuator to raise its pH at the point of delivery from the dispenser, such as in a dispensing conduit fluidly coupled to a reservoir containing the whitening fluid. The pH of the whitening fluid stored in the reservoir however is not raised or increased during the process. The circuit is selectively energized by the user via the actuator, which in some embodiments may be in unison with dispensing the whitening fluid. Advantageously, the whitening agent dispenser allows storage of the whitening fluid at a lower pH ideal for maximum shelf life, but is capable of elevating the pH of the dispensed fluid at the time of dispensing for optimum whitening performance. In one embodiment, the whitening fluid comprises a hydrogen peroxide-water based mixture.

The oral care agent dispenser includes a suitable dispensing mechanism for dispensing the whitening fluid. Examples include without limitation push-button ratcheting type mechanisms, rotary mechanisms, or others. The dispensing mechanism includes a manually operated actuator which is configured to dispense the oral care agent and simultaneously energize the electrical circuit in one implementation. In other implementations, the actuator is configured so that upon cessation of actuation of the actuator, the first and second electrodes are de-energized at a first time and the dispensing mechanism is deactivated at a second time subsequent to the first time. In some embodiments, a control circuit board with programmable microcontroller 61 may be provided to control operation of the dispenser. The microcontroller may be operably coupled to the actuator, dispensing mechanism, and power source. The microcontroller may be configured in one embodiment to cause the foregoing delayed deactivation of the dispensing mechanism at the second time which may be preprogrammed into the microcontroller. In other embodiments, the first and second electrodes and the dispensing mechanism may be deactivated simultaneously with cessation of the actuation of the actuator.

In one embodiment, the whitening dispenser can be configured for applying the electrochemically-activated whitening fluid into any existing whitening tray system worn by the user, to enhance the whitening efficacy of the tray device. The whitening fluid is typically a gel when used with trays. The whitening trays are a cast and molded devices containing an impression of the user's teeth and known in the art. The pH-boosted peroxide whitening gel is applied by the user using the dispenser to the tray device, which will be worn in the mouth for the directed amount of time, holding the pH enhanced gel against the tooth surfaces. The high pH of the dispensed gel (e.g. 10 or more in some cases and as high as 11 or 12) results in a faster and more noticeable whitening effect than would be expected from a lower pH 5.5 peroxide formula coinciding with the pH of the gel in the dispenser storage reservoir. Utilizing a mouth tray to hold the pH-boosted whitening gel against the teeth allows for longer contact time, and therefore, improved whitening efficacy, than might otherwise be possible without the tray, due to contact with saliva, lips, and cheeks.

One key benefit of the present invention is versatility. Many teeth whitening systems on the market today require a tray device. The dispensing tip portion and associated discharge opening of the dispenser can be terminated with an applicator in the form of a relatively narrow nozzle in construction for easy and accurate application of the whitening gel into any tray geometry. Furthermore, the whitening dispenser device can be used to provide an additional whitening benefit to a user who regularly wears a mouth tray that is intended for a different purpose, i.e. dispensing an electrochemically-activated whitening gel into a night guard or retainer tray, allowing the user to effortlessly achieve noticeably whiter teeth while wearing the tray for the different purpose.

In other embodiments, the whitening agent dispenser may be terminated at a distal end with a porous chiseled or a brush applicator tip to dispense the whitening agent therethrough from the dispenser's reservoir. This embodiment may be used to apply the whitening liquid directly to the surfaces of the teeth without intermediary use of a whitening tray.

In yet other embodiments, the oral care agent dispenser may be configured and operable to apply an electrical charge to oral care agents other than whitening peroxide and water based mixtures (e.g. anti-bacterial, sensitivity relief, etc.), which also may benefit from the electrical charge. Applying an electrical charge to such other oral care agents or substances increases ion concentrations of the agent at the distal electrode at the dispensing end of the dispenser. This advantageously improves the efficacy of those agents and treatment of various oral cavity conditions.

In another embodiment, the oral care agent dispenser may be a modular oral care platform configured to accommodate replaceable chemistry/refill cartridge with dispensing tips which can hold a variety of oral care agents, such as without limitation peroxide/water-based whitening agents, sensitivity relief agents, anti-bacterial agents, and others. The cartridges may be user replaceable and fully interchangeable in one implementation. Such oral care agent dispensers may have a pen-like structure generally comprising a proximal powered base unit containing the power supply/electronics and dispensing mechanism, and one or more replaceable and interchangeable chemical cartridges detachably mountable to the distal end of the base unit. A common mounting interface is provided on the base unit and chemical cartridges for cartridge interchangeability.

In other embodiments, an oral care kit comprises the foregoing two-piece oral care agent dispenser includes a single re-usable powered base unit and a plurality of replaceable cartridges each having the same or different chemical compositions/substances.

According to one aspect, an oral care implement comprises: a housing comprising a reservoir and a dispensing conduit terminating in a discharge opening, the dispensing conduit fluidly coupled to the reservoir for delivering an oral care fluid from the reservoir to the discharge opening; an electrical circuit comprising, in operable coupling, a power source, a first electrode electrically coupled to the oral care fluid, and a second electrode disposed in the dispensing conduit and electrically coupled to the oral care fluid in the dispensing conduit; an actuator operably coupled to the electrical circuit and configured to energize the first and second electrodes upon being actuated, thereby generating an electrical charge at the second electrode to which the oral care fluid in the dispensing conduit adjacent the second electrode is exposed.

In another aspect, an oral care whitening agent dispenser comprises: a housing including a longitudinal axis, a proximal end, a distal dispensing end, and a reservoir between the ends; the reservoir containing a flowable tooth whitening agent having a first pH; an electrical circuit comprising in connected relationship a power source, a distal electrode in contact with the whitening agent located adjacent the distal dispensing end, and a proximal electrode in contact with the whitening agent and spaced apart in a proximal direction from the first electrode; a dispensing mechanism operable to dispense the whitening agent; an actuator operably coupled to the dispensing mechanism and the electrical circuit; and wherein activating the actuator both dispenses the whitening agent and applies an electrical charge to the whitening agent being dispensed causing an electrochemical reaction which increases the pH of the dispensed whitening agent.

In another aspect, a method for whitening teeth comprises: providing a dispenser containing a whitening agent; subjecting the whitening agent to an electrical charge; dispensing the whitening agent onto a wearable tray; and applying the tray to the teeth.

In another aspect, a method for whitening teeth comprises: providing a dispenser containing a whitening agent; subjecting the whitening agent to an electrical charge; and dispensing the whitening agent onto surfaces of teeth.

In yet another aspect, an oral care implement comprises: a housing comprising a reservoir, and a dispensing conduit terminating in a discharge opening, the dispensing conduit fluidly coupled to the reservoir for delivering an oral care fluid from the reservoir to the discharge opening; an electrical circuit comprising, in operable coupling, a power source, a first electrode electrically coupled to the oral care fluid, and a second electrode disposed electrically coupled to the oral care fluid; a dispensing mechanism configured to dispense the oral care fluid from the reservoir via the discharge opening when activated; an actuator operably coupled to the electrical circuit and to the dispensing mechanism and configured so that user actuation of the actuator (i) energizes the first and second electrodes to subject the oral care fluid to an electrical field; and (ii) activates the dispensing mechanism to dispense the oral care fluid via the discharge opening.

In another aspect, a modular oral care system for dispensing an oral care agent comprises: a replaceable cartridge comprising: a reservoir containing an oral care fluid; and at least one first electrode electrically coupled to the oral care fluid; a base unit configured for detachable coupling to the replaceable cartridge, the base unit comprising: an electrical circuit comprising a power source; wherein the first electrode is operably coupled to the electrical circuit when the cartridge is coupled to the base unit.

A modular dispenser for dispensing an oral care agent comprises: a cartridge comprising: a reservoir containing an oral care fluid; a dispensing conduit fluidly coupled to the reservoir for delivering the oral care fluid; and a first electrode electrically coupled to the oral care fluid; a base unit detachably coupled to the cartridge, the base unit comprising: an electrical circuit including a power source and a second electrode; a dispensing mechanism comprising a movable piston, the second electrode mounted to the movable piston; an actuator operably coupled to the dispensing mechanism that, when actuated, advances the movable piston into the reservoir so that the second electrode comes into electrical coupling with the oral care fluid.

In another aspect, a method for using a modular oral care fluid dispensing system comprises: providing a powered base unit including a power source and a dispensing mechanism; coupling the cartridge to the base unit, the cartridge including a reservoir containing an oral care fluid and a distal dispensing end; and puncturing a frangible seal on the reservoir so that an electrode of the base unit comes into contact with the oral care fluid in the reservoir.

In yet another aspect, a replaceable cartridge comprises: a reservoir containing an oral care fluid; a first electrode arranged to apply an electrical charge to the oral care fluid; and an electrical contact electrically connected to the electrode, the contact configured for engaging an electrical contact on an external device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The features, and advantages of the invention will be apparent from the following more detailed description of certain embodiments of the invention and as illustrated in the accompanying drawings in which.

Figure 1:
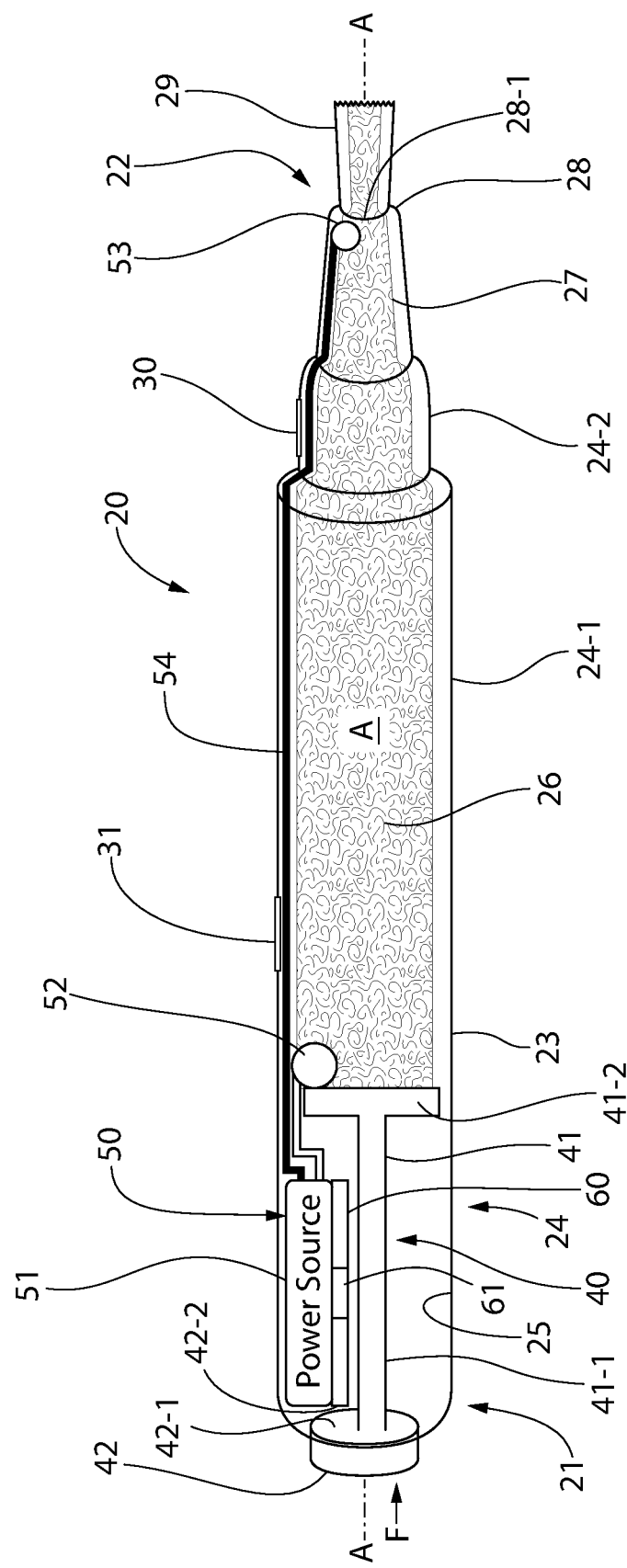
FIG. 1 is a schematic side cross-sectional perspective view of an oral care agent dispenser according to one embodiment of the invention.

All drawings are schematic and not necessarily to scale. Features numbered in some views but not in others are the same features unless expressly noted otherwise herein.

DETAILED DESCRIPTION

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

Figure 2:
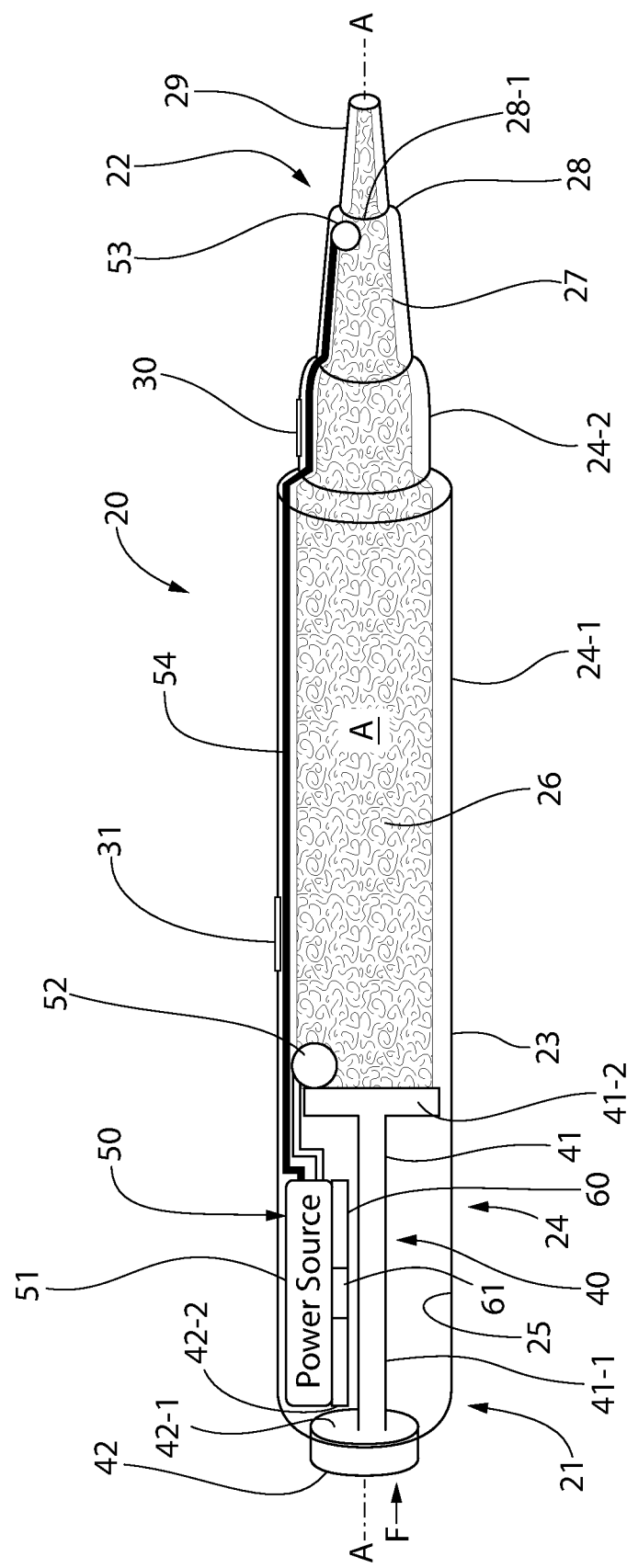
FIG. 2 is a schematic side cross-sectional perspective view of the dispenser of FIG. 1 with a dispensing end applicator in the form of a non-porous frustoconical nozzle.

Referring to FIGS. 1-2, an oral care implement according to the present disclosure may be a hand-held tooth whitening pen or dispenser 20 containing a tooth whitening agent A. The whitening agent may in gel or liquid form in some embodiments (collectively a flowable "fluid" by definition). Whitening dispenser 20 may comprise an elongated tubular body or housing 24 including a proximal end 21, a distal end 22, and sidewalls 23 extending between the ends along a longitudinal axis A-A coinciding with the centerline of the dispenser. Sidewalls 23 may be generally cylindrical in one configuration; however, any sidewall profile or shape may be used. An internal cavity 25 is formed within the housing which includes a reservoir 26. Reservoir 26 is located between the proximal and distal ends of the housing. The reservoir 26 is configured for storing a volume of the whitening agent.

In one configuration, whitening dispenser housing 24 may have a stepped configuration including a proximal main portion 24-1 and a distal dispensing portion 24-2 having a smaller cross-sectional area (e.g. diameter for cylindrical embodiments of the housing) than the main portion. A shoulder 24-3 is formed between the larger diameter main portion and the smaller diameter dispensing portion. Reservoir 26 extends through the proximal end of main portion 24-1 and the dispensing portion 24-2 as shown. The distal end of housing main portion 24-1 is occupied by the power source and dispensing mechanism, as further described herein. Other housing configurations and arrangements may be used.

Housing 24 further defines and includes a dispensing conduit 27 formed at the distal end 22 of the housing for dispensing the whitening agent. Dispensing conduit 27 is fluidly coupled to the reservoir 26 to receive the whitening agent. The dispensing conduit 27 includes a proximal end coupled to the reservoir and a dispensing distal end formed in and terminated with a discharge opening 28-1. The whitening agent exits the dispenser from the dispensing conduit 27 through opening 28-1 when dispensed. Discharge opening 28-1 may be located in a conically shaped tip extension or portion 28 of the dispenser in some embodiments.

Figure 3:
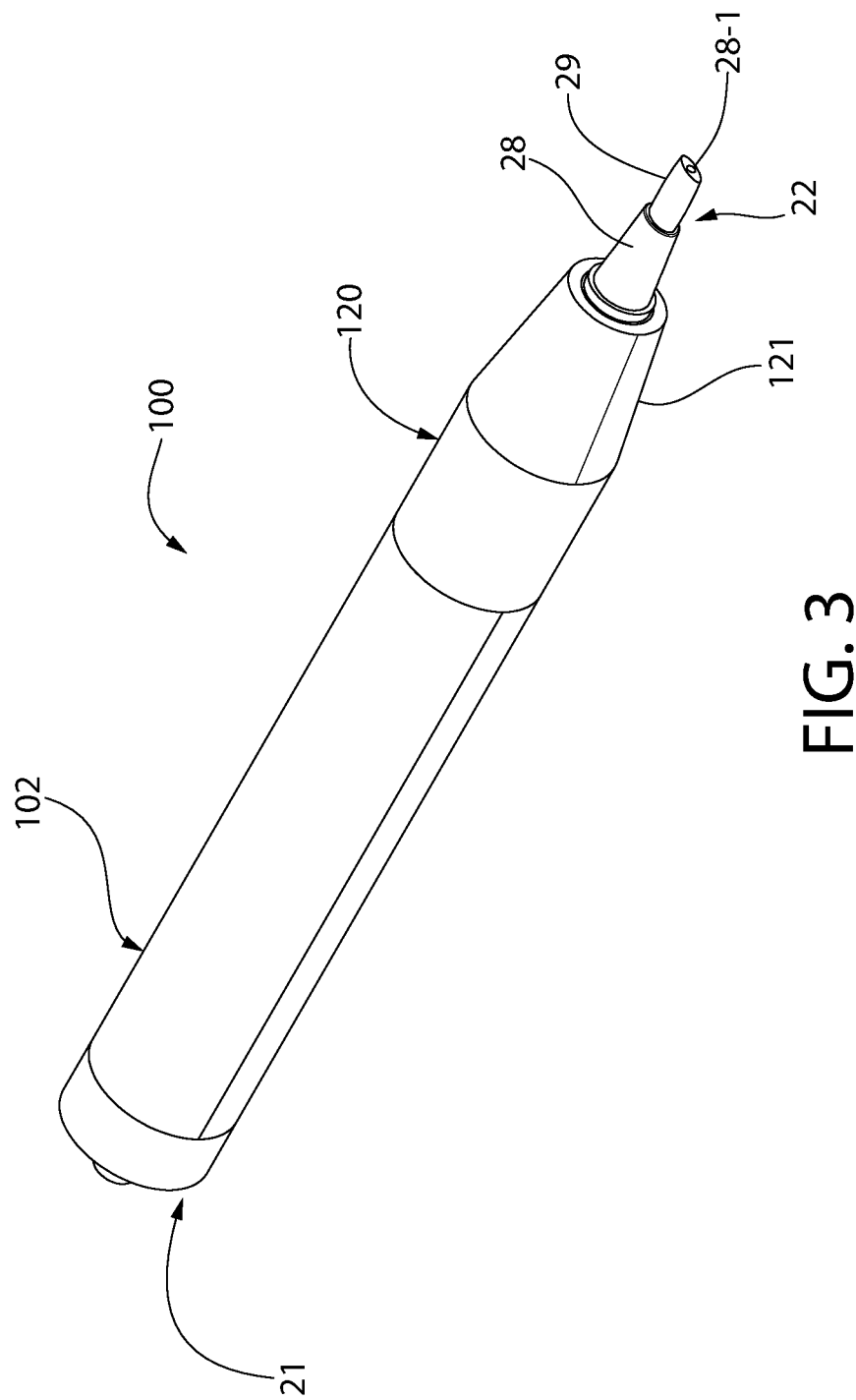
FIG. 3 is a front (distal) perspective view of a modular oral care agent dispenser comprising a powered base unit and a detachable chemical cartridge containing the oral care agent.
Figure 4:
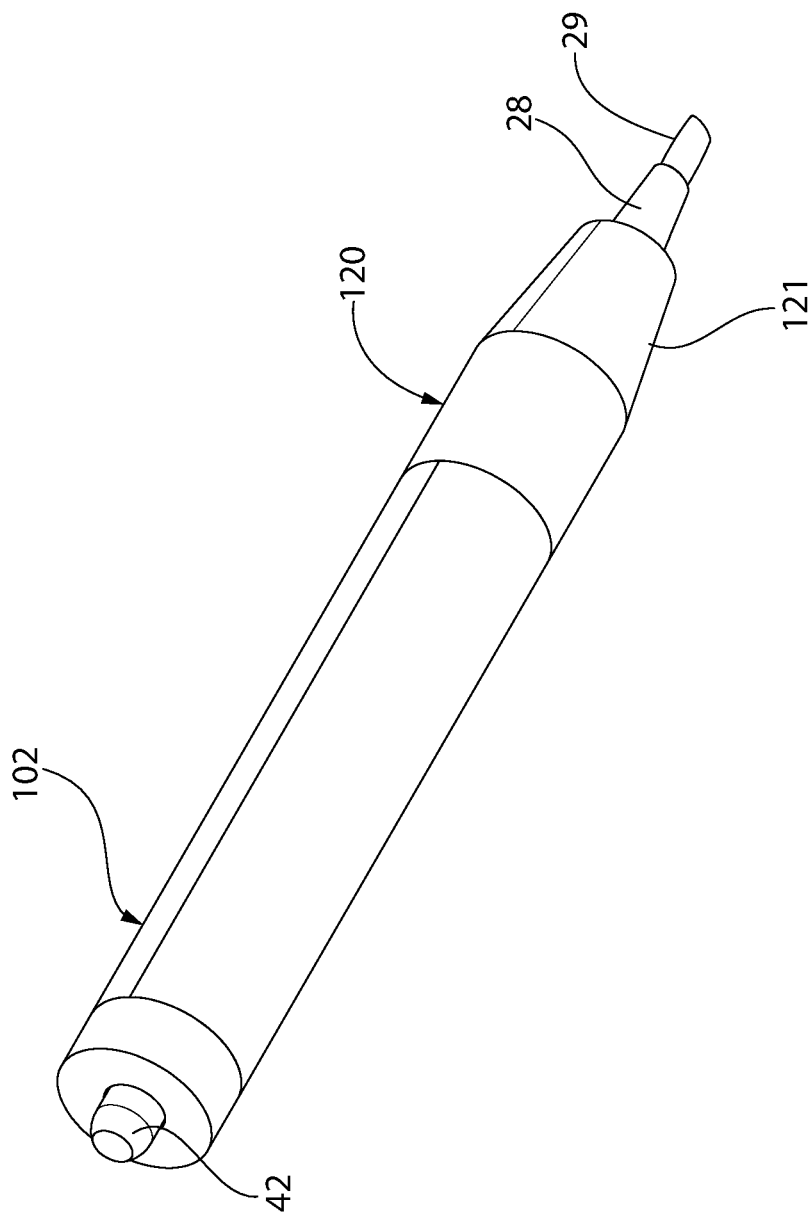
FIG. 4 is a rear (proximal) perspective view thereof.
Figure 5:
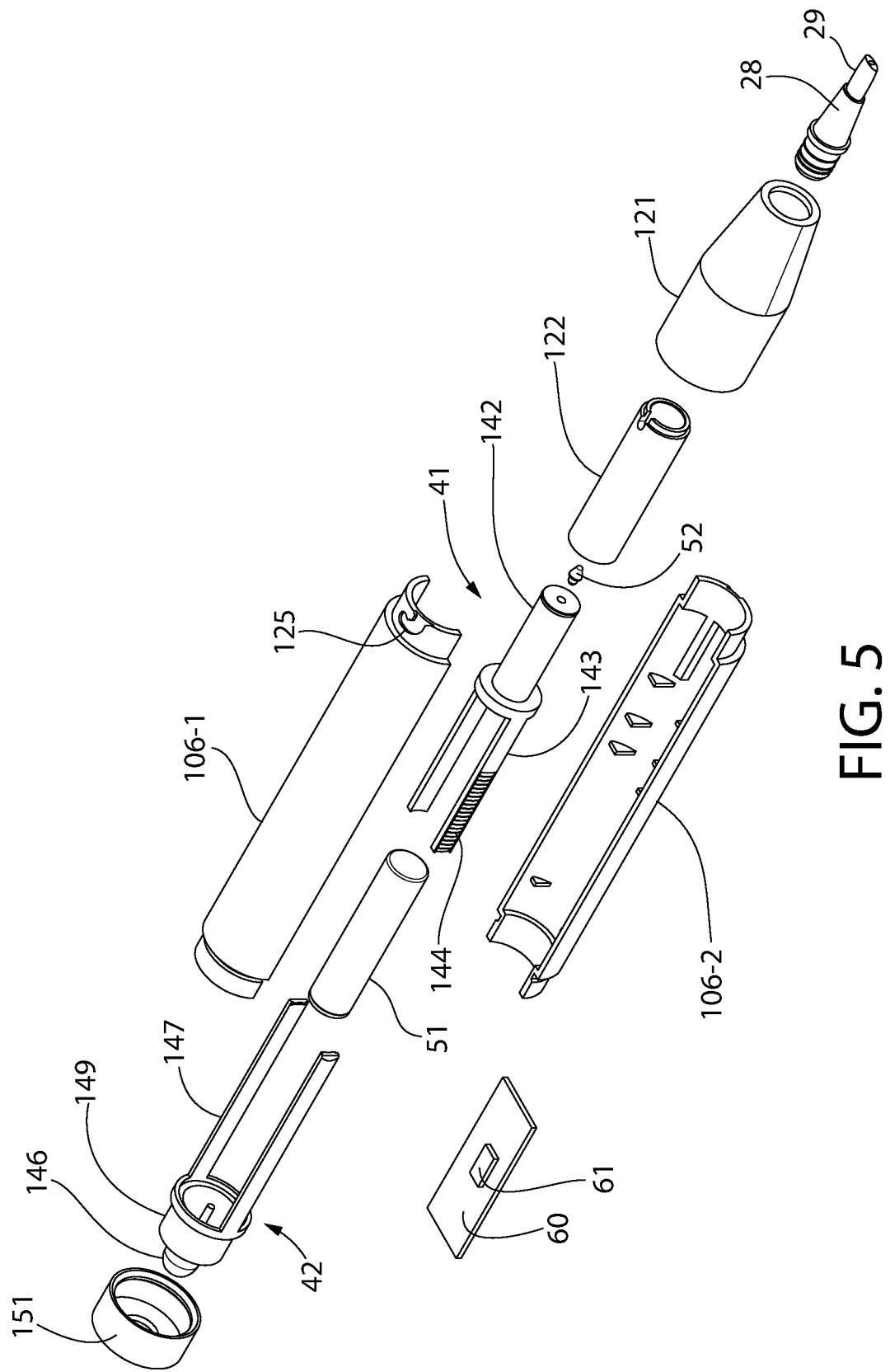
FIG. 5 is a front (distal) exploded perspective view thereof.
Figure 6:
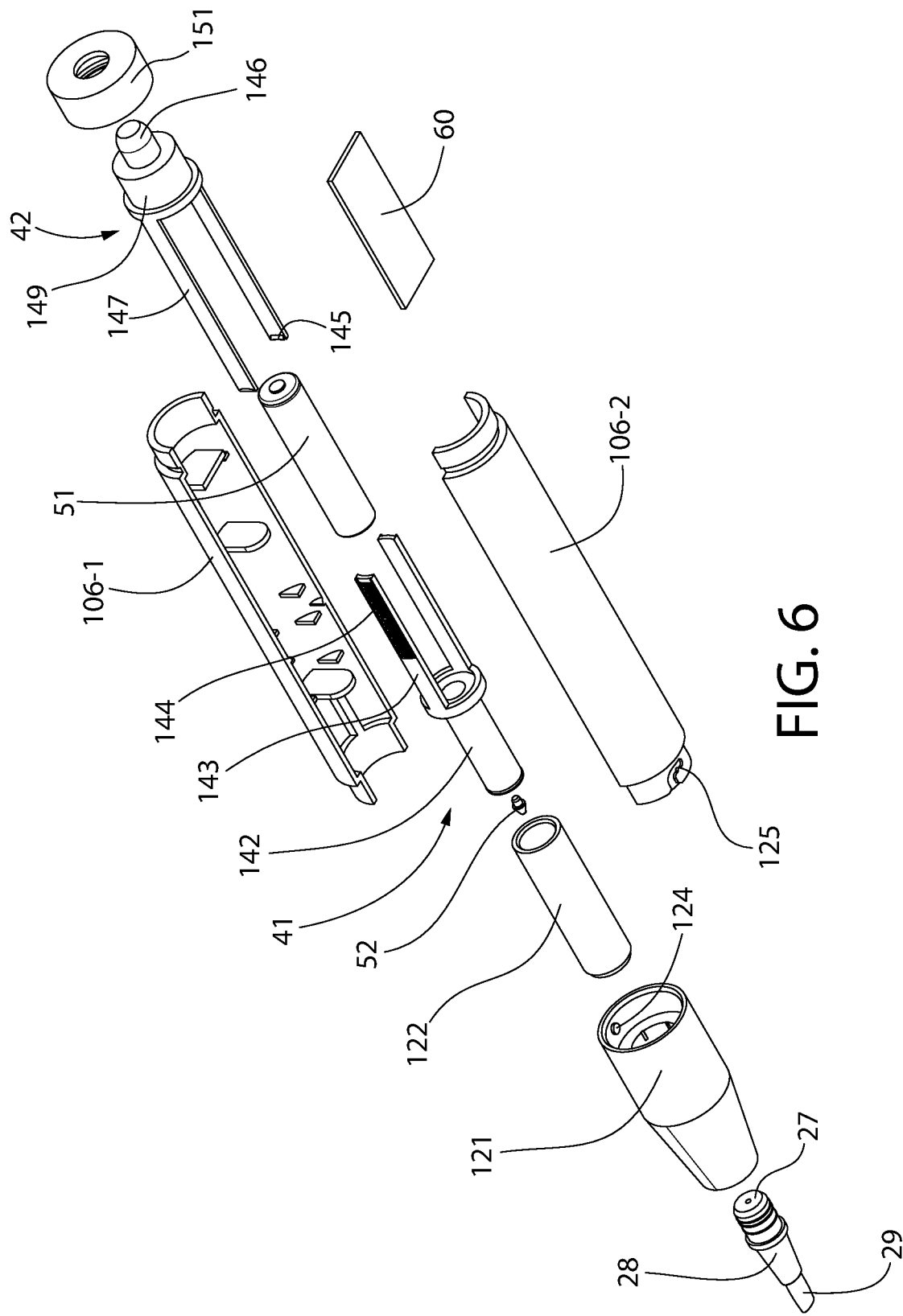
FIG. 6 is a rear (proximal) exploded perspective view thereof.
Figure 7:
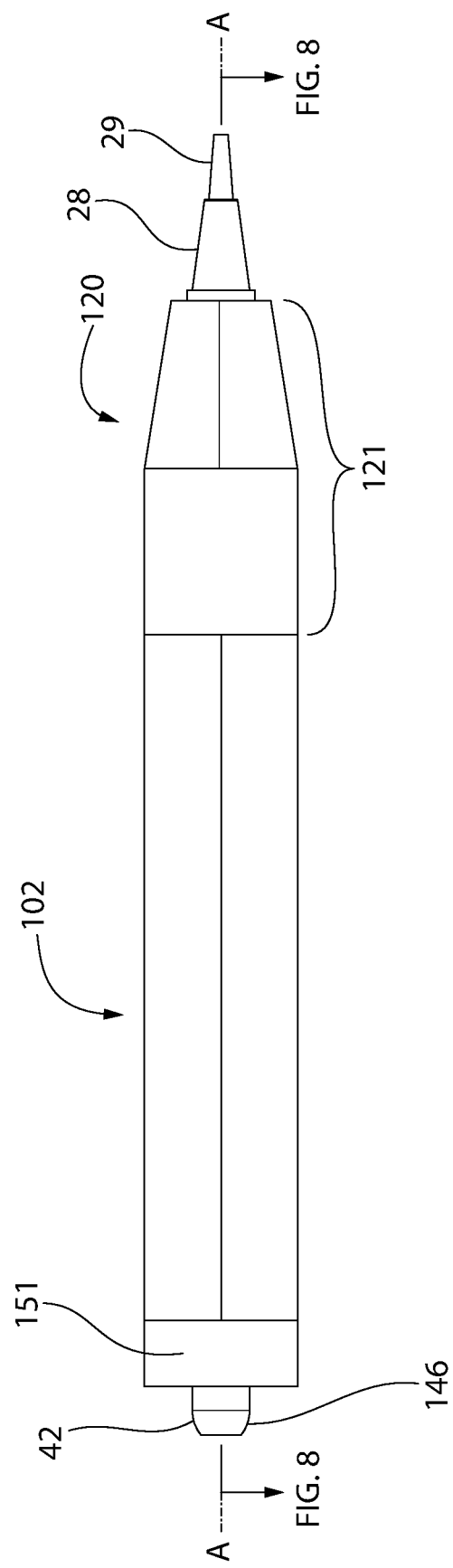
FIG. 7 is a side view thereof.
Figure 8:
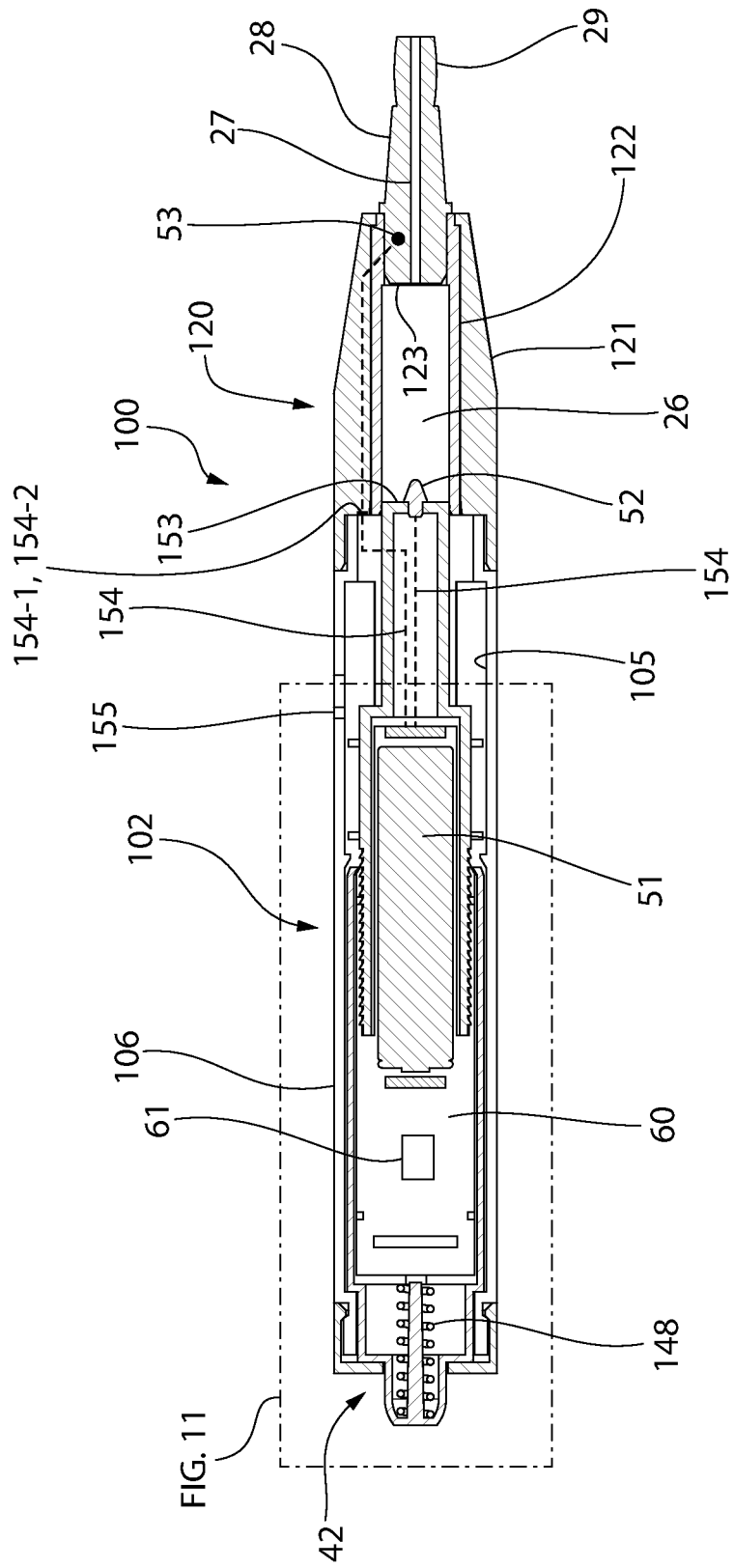
FIG. 8 is cross-sectional view taken from FIG. 7.
Figure 9:
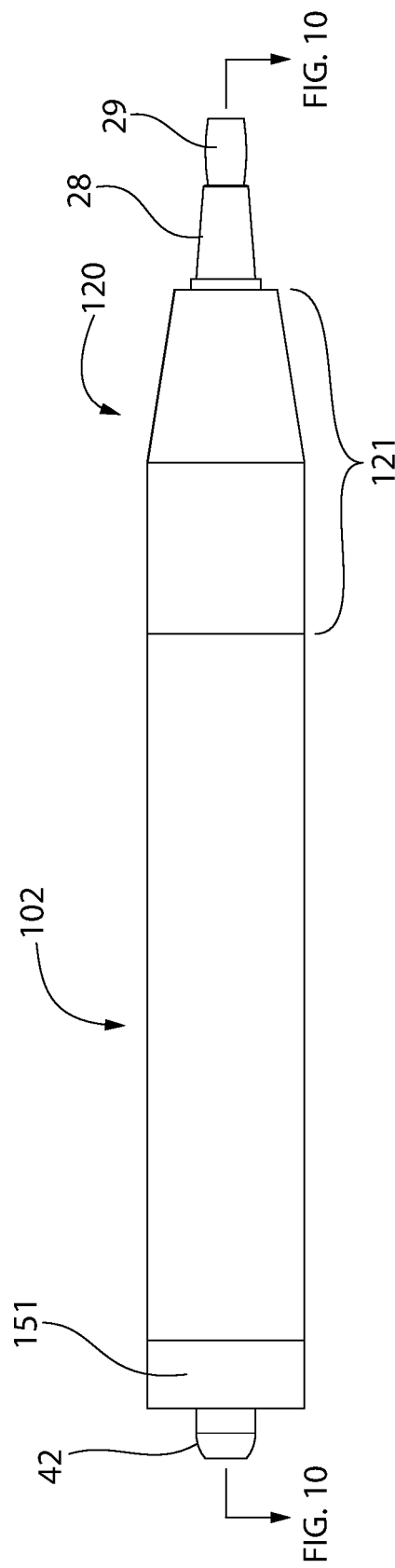
FIG. 9 is a top view of the dispenser of FIG. 3.
Figure 10:
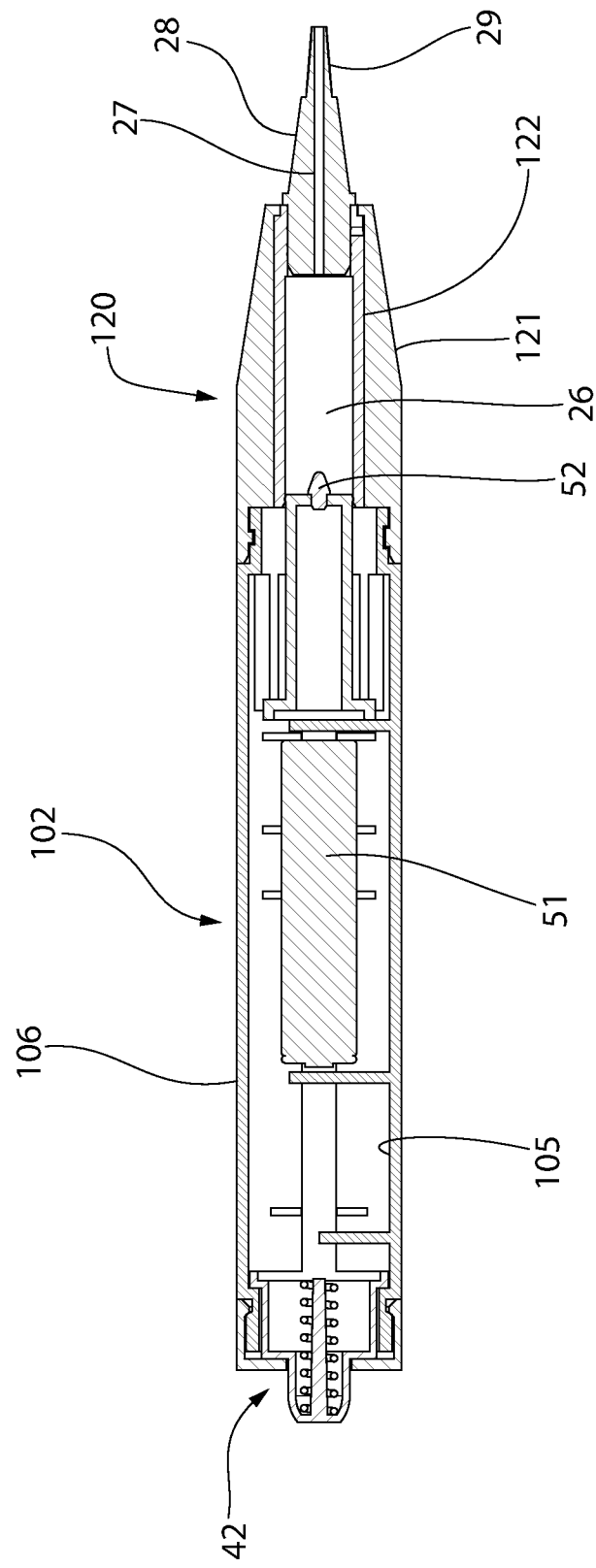
FIG. 10 is a cross-sectional view taken from FIG. 9.
Figure 11:
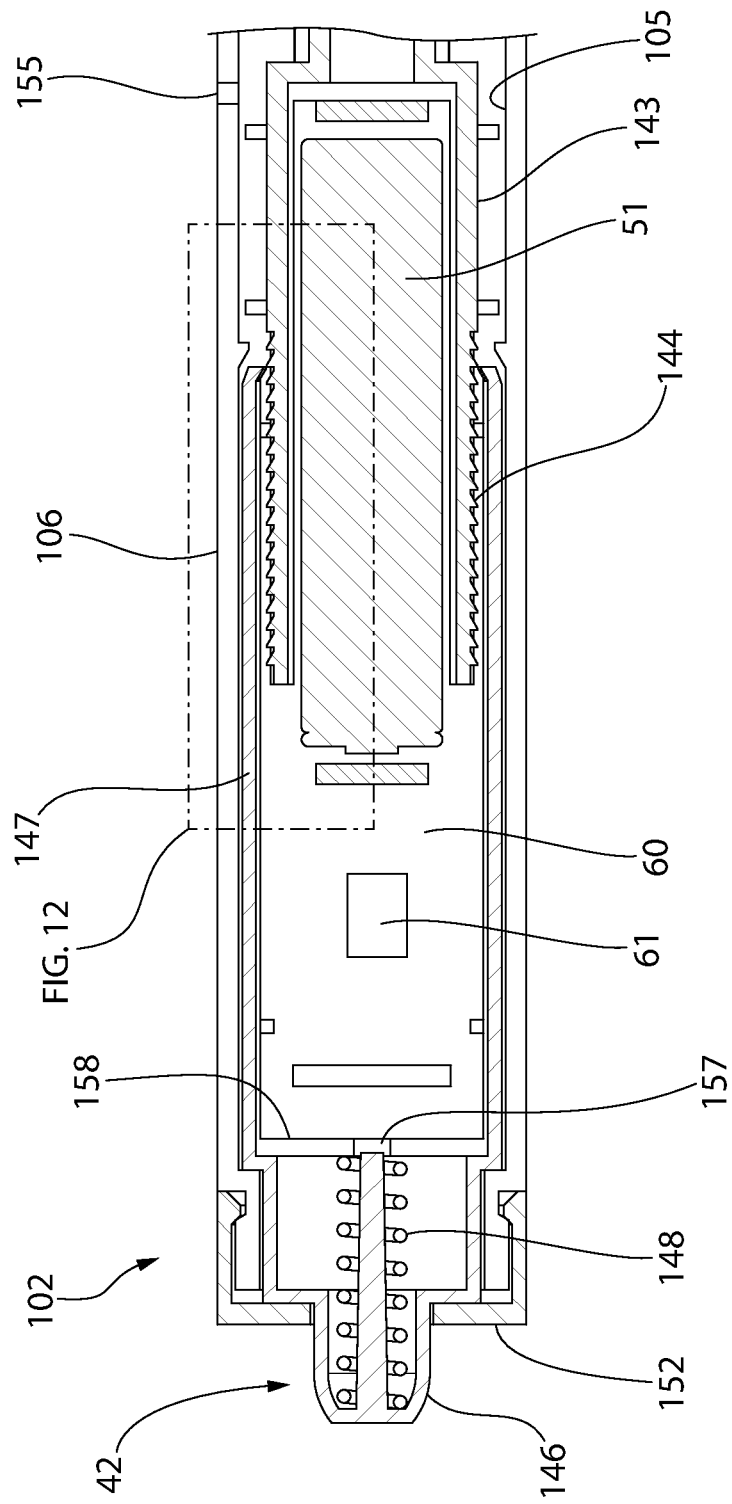
FIG. 11 is a detailed view taken from FIG. 8.
Figure 12:
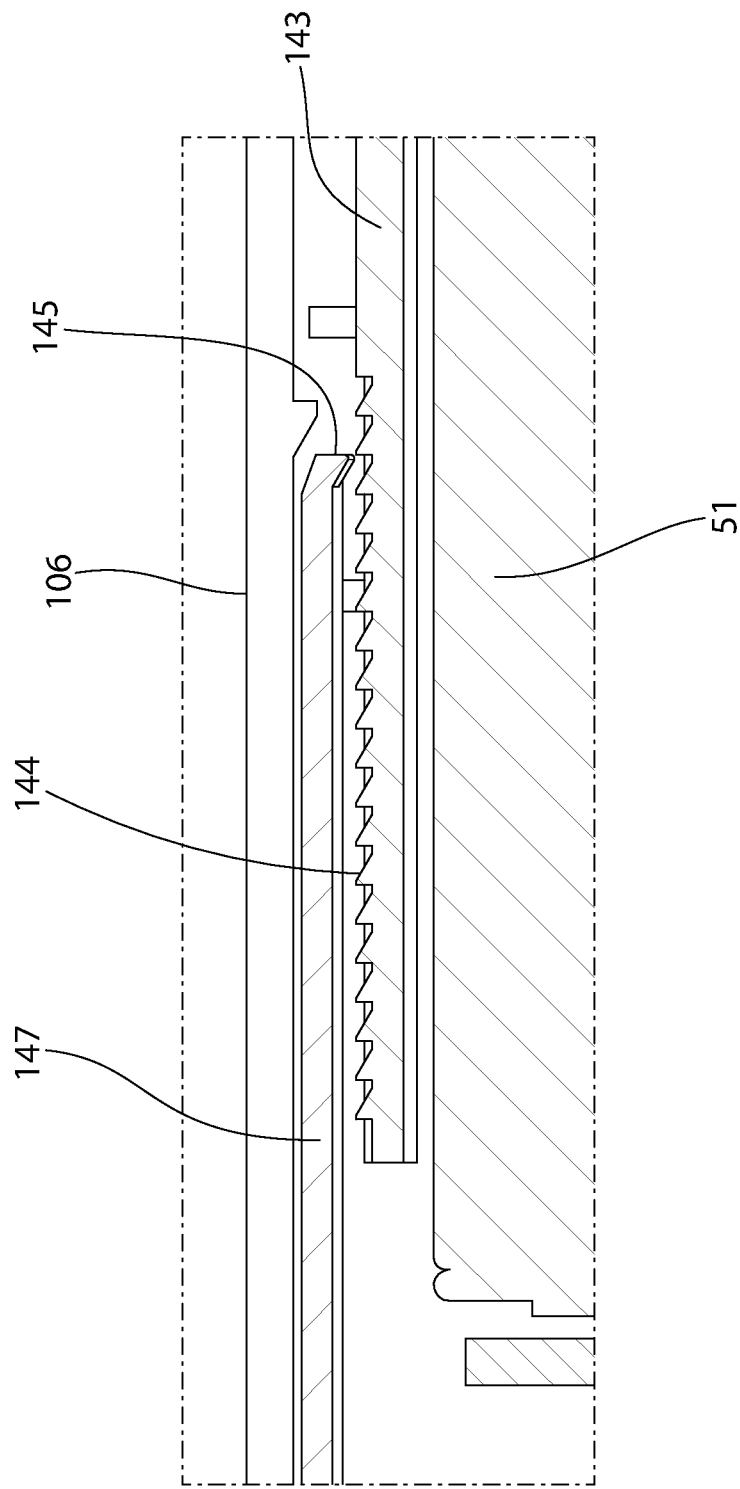
FIG. 12 is a detailed view taken from FIG. 11.
Figure 13:
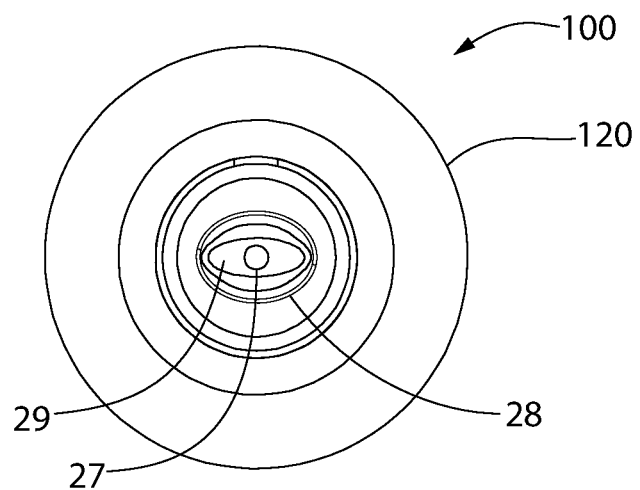
FIG. 13 is a front (distal) end view of the dispenser of FIG. 3.
Figure 14:
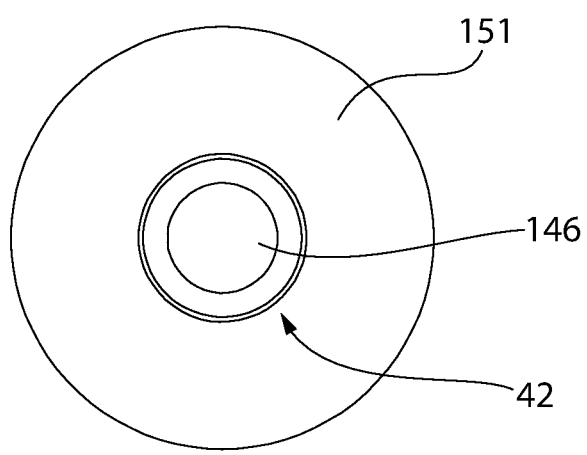
FIG. 14 is a rear (proximal) end view of the dispenser of FIG. 3.
Figure 15:
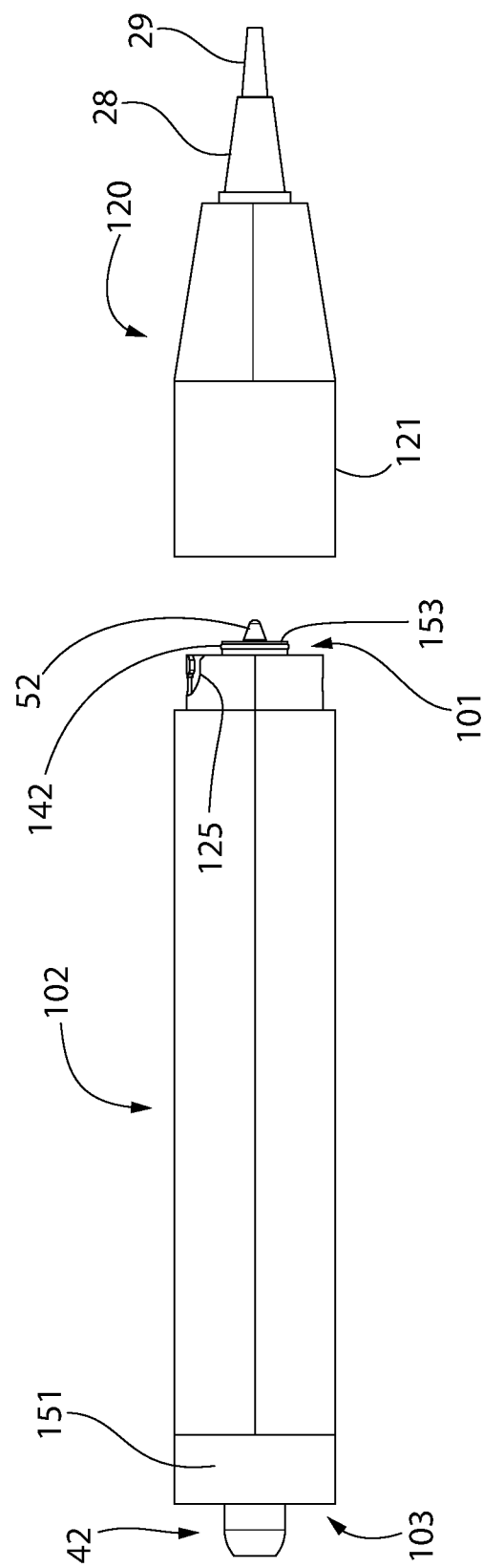
FIG. 15 is a side view of the dispenser of FIG. 3 showing the chemical cartridge separated from the powered base unit.
Figure 16:
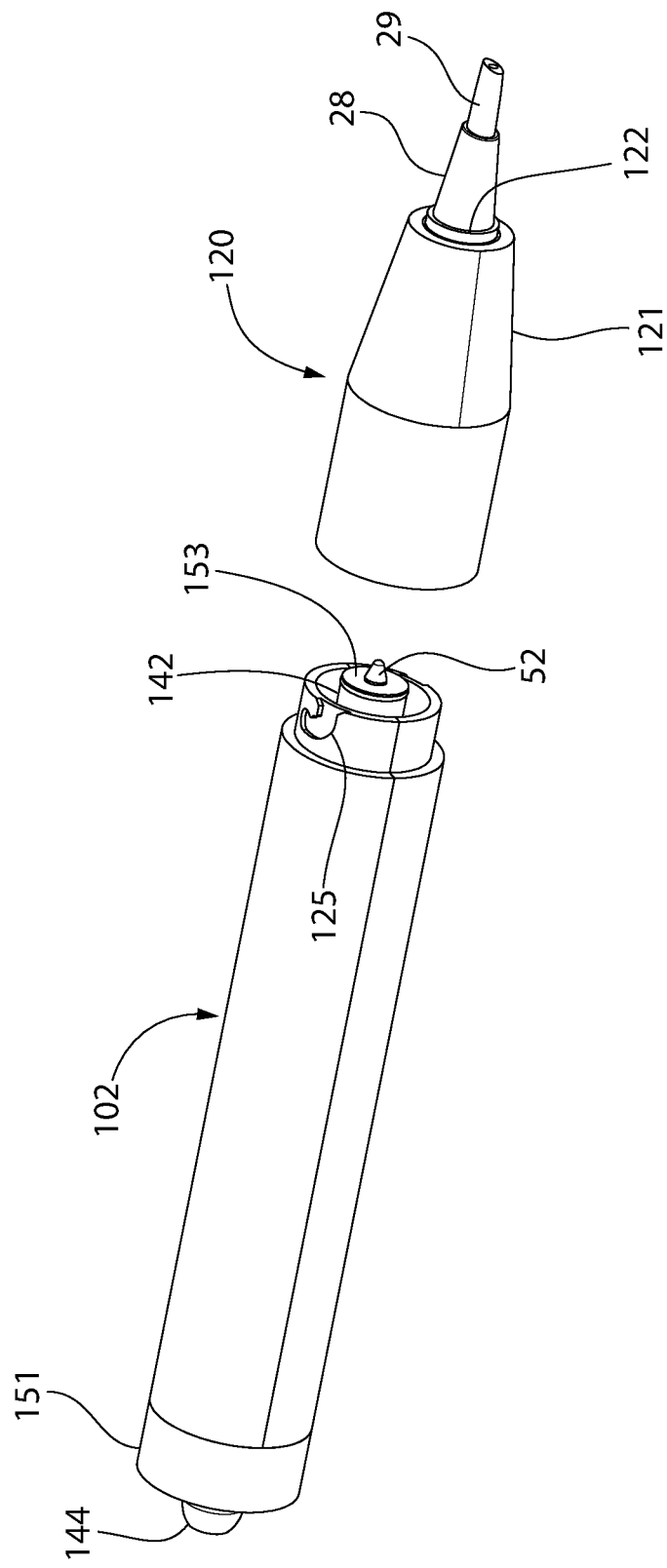
FIG. 16 is front (distal) perspective view thereof.
Figure 17:
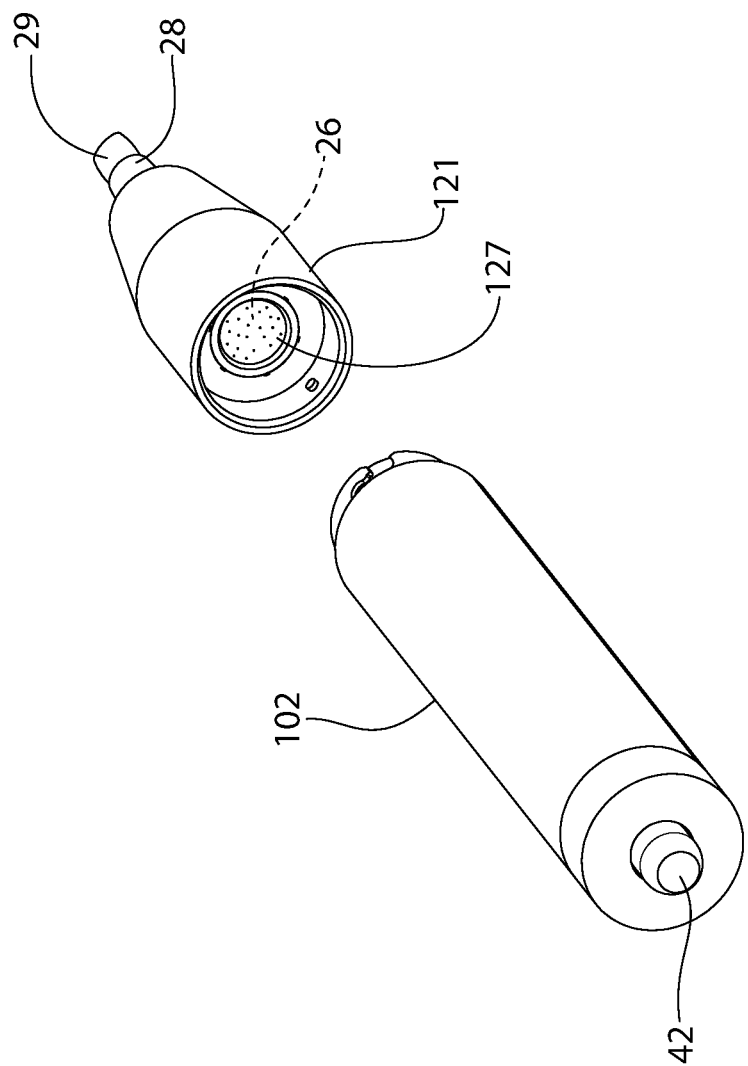
FIG. 17 is a rear (proximal) perspective view thereof.

A fluid-delivery applicator 29 may be coupled directly to the distal end of the dispenser such as dispenser tip portion 28. Applicator receives the whitening fluid from the dispensing conduit 27 for directly applying the whitening agent to the user's teeth in the oral cavity. In one example, applicator 29 may be a flexible type applicator such as a brush or a porous element. The dispensing conduit 27 may be continued and extend completely through the applicator (see, e.g. FIG. 2 or 8) such that the secondary discharge opening 28-2 is formed by the distal end of the applicator. Applicator may be formed of a non-porous or porous material. Either construction may be used. Applicator 29 may be axially elongated and chisel-shaped in some embodiments (see, e.g. FIG. 1 or 3), or a rigid dispensing nozzle in other embodiments (see, e.g. FIG. 2). The applicator 29 may be coupled to the distal end 22 of the dispenser 20 (e.g. dispensing tip portion 28) in any suitable manner, such as via partial insertion into the tip portion to receive the whitening agent from the reservoir. The whitening agent/fluid may be in liquid or gel form in this example of a whitening dispenser with an applicator tip. Adhesives or mechanical fixation means (e.g. crimped engagement, etc.) may be used in conjunction with the partial insertion fit in some non-limiting examples to achieve permanent fixation to the dispenser housing 24. Applicator 29 may be constructed of a suitable wettable porous filtration-type material selected for receiving and transmitting the whitening liquid through the applicator tip material for application directly onto the surfaces of the teeth. Suitable applicator materials are available from various commercially sources such as Porex Technologies, Atlanta, Georgia.

The fluid dispensing system according to the present disclosure generally includes a fluid dispensing mechanism 40 operable to extrude or extract the whitening agent A from the reservoir 26 and dispense the agent through the tip portion 28 of the housing 24. Any type of fluid dispensing mechanism 40 capable of including in a hand-held dispensing device may be used for this purpose. In one embodiment shown in FIG. 1, the fluid dispensing mechanism 40 may be piston operated comprising an axially movable plunger or piston 41 and operably coupled to a movable actuator 42. The elongated stem 41-1 of the piston 41 may be coupled to the actuator 42 and the diametrically enlarged head 41-2 of the piston acts on the whitening fluid in the reservoir 26. The actuator 42 may be a push-button actuator comprising a push-button movably coupled to proximal end 21 of the dispenser housing 24 as shown. Depressing the actuator 42 with a user-applied force F in an axial direction (parallel to longitudinal axis A-A) causes the piston 41 to advance towards the distal end 22 of the dispenser, thereby extruding and discharging the whitening fluid from the dispenser.

In other possible embodiments shown in FIG. 2, the dispensing mechanism 40 may be a ratchet mechanism 43 comprising a rotary/twist type actuator 42 coupled to proximal end 21 of the dispenser housing 24. Rotating or twisting the actuator 42 advances the plunger/piston 41 axially towards the distal end 22 of housing 24 to extrude the whitening fluid from the reservoir 26 in a similar manner to that described above. The ratcheting mechanism 43 is configured to convert rotary motion of the actuator 42 into linear motion of the plunger/piston. Other types of dispensing mechanisms may be used to expel the whitening fluid from the dispenser reservoir 26.

Referring to FIGS. 1 and 2, the fluid dispensing system also includes a venting system to allow the gas generated by the electrochemical reaction of the whitening agent within the dispenser housing to escape the enclosed system to atmosphere, thereby relieving pressure from the reaction. A pair of gas permeable membrane type vents may be provided which extend completely through the housing 24 in one embodiment. The vents may be formed from PTFE (polytetrafluoroethylene) membrane filters in one embodiment which retains the fluid inside the dispenser 20, but allows gas to escape to atmosphere through the filter membrane. PTFE filters are naturally hydrophobic which retains the whitening fluid in the dispenser, but allows any accumulating gas from the electrochemical reaction to escape. One stationary distal vent 30 is disposed in the housing 24 or dispensing conduit 27 proximate to distal end 22 of the housing 24. This vent is in fluid communication with the reservoir 26 in the distal end portion 24-2 of the housing and dispensing conduit 27. The other proximal vent 31 is disposed in the housing 24 near the proximal end portion of the reservoir 26, generally closer to the plunger/piston head 41-2 as illustrated. This vent formed through the main portion 24-1 of housing 24 is in fluid communication with the main portion of the reservoir 26. The proximal vent 31 may be stationary and fixed in position on the housing 24 as shown in FIG. 1.

According to one aspect of the invention, the dispenser 20 is configured to apply an electrical charge to the whitening fluid or other type oral care agent being dispensed. For a water and hydrogen peroxide based whitening agent/substance, this triggers an electrochemical reaction which increases the pH of the dispensed fluid for optimizing its tooth whitening performance as previously described herein.

Accordingly, with reference to FIGS. 1-2, dispenser 20 includes an electrical circuit 50 comprising a power source 51, a proximal electrode 52, and a distal electrode 53. Each of the electrodes is electrically connected to the power source. Distal electrode 53 is disposed inside housing 24 proximate to the dispensing distal end 22, such as within or adjacent to dispensing conduit 27 and proximately/adjacent to the discharge opening 28-1. This electrode applies a localized electrical charge to the whitening fluid being dispensed when the circuit 50 is energized which results in a localized increase in pH of the dispensed portion of the fluid at the dispensing distal end 22 of the dispenser. The proximal electrode 52 is disposed within or adjacent to the main portion 24-1 of the housing in reservoir 26 and located proximately/adjacent to the plunger/piston 41 as shown (e.g. near piston head 41-2). Electrode 52 may be attached to and movable with piston 41 as whitening fluid is dispensed from the reservoir. The electrodes 52, 53 are spaced axially apart along longitudinal axis A-A.

In some embodiments, the proximal electrode may be an elongated axially oriented conductive strip formed of a metallic material which is exposed to the oral care fluid in the reservoir. As the piston advances, the distal portions of the strip ahead of the piston remain exposed and in physical contact with the oral care material as it is dispensed.

Power source 51 may be any type of self-contained portable source. For example, the power source 51 may be a disposable or rechargeable battery or batteries of any type. Some non-limiting examples include a AA size battery, AAA size battery, a 3V coin cell battery, or others all of which may be used to power the electrical circuit 50.

The dispensing mechanism 40 and electrical circuit 50 cooperate and are mutually configured such that actuating the actuator 42 (e.g. pushing or rotating) will energize the electrical circuit. Accordingly, the actuator 42 is configured, arranged, and operable to both dispense the whitening fluid F via activating the dispensing mechanism 40 and concomitantly energize the circuit 50 simultaneously. Actuating the actuator 42 thus will apply a voltage across the electrodes 52, 53, as well as advance the piston 41, causing the peroxide-containing whitening fluid passing over the distal electrode 53 to receive an electrical charge which raises its initial pH to a higher pH. The pH of the dispensed whitening fluid is advantageously increased without affecting or raising the pH of the whitening fluid remaining in the bulk of the main reservoir 26 located more proximally in the main portion of the housing 24. The dispenser 20 thus dispenses a local, on-demand amount of peroxide whitening fluid with an increased pH level thereby improving whitening efficacy. The shelf life of the remaining whitening fluid in the dispenser is also optimized since its pH has not been raised by the electrical charge.

In one non-limiting example, a metallic electrical contact 42-1 may be attached to and moves with the actuator 42 when depressed, which in turn contacts a mating electrical contact 42-2 in the housing to close and complete the electrical connection and circuit 50 which becomes energized to provide an electrical charge to the oral care agent. Other examples of electrical contacts associated with the actuator are described below with respect to oral care agent dispenser 100 with replaceable chemical cartridges.

Dispenser 20 further includes control electronics such as control circuit board 60 with microcontroller 61 operably coupled thereto. As well understood in the art, a microcontroller is a self-contained compact integrated circuit on a single chip with processor and all appurtenances that function as a fully operational control computer to control the specific operation of the dispenser 20. Microcontroller 61 is thus operably and communicably coupled to the electrical circuit 50 and actuator 42 for controlling operation of the power supply and dispensing. Microcontroller 61 (schematically depicted in FIGS. 1 and 2) is configured and operable to execute program instructions or code (e.g. control logic or software/firmware). The power source 50 may be mounted to circuit board 60, or supported within the dispenser housing via a separate battery mounting chassis or compartment.

The microcontroller 61 may generally include one or more processors (CPUs/MPUs), non-transitory tangible computer readable medium, and programmable input/output peripherals which may be used to upload/download data and program control instructions to/from the microcontroller. Computer readable medium may include volatile memory and non-volatile memory operably and communicably coupled to the processor(s). Any suitable combination and types of volatile or non-volatile memory may be used including as examples, without limitation, random access memory (RAM) and various types thereof, read-only memory (ROM) and various types thereof, flash memory, or other memory which may be written to and/or read by the processor operably connected to the medium. Both the volatile memory and the non-volatile memory may be used for storing the program instructions or software.

The input/output peripherals provide a communication interface or module configured for wireless and/or wired communication for programming the processor and exchanging data with the microcontroller 61. Wireless communication protocols used may include Bluetooth, NFC (near field communication), WiFi, or others. It is well within the ambit of one skilled in the art to provide and configure the microcontroller with all the required appurtenances to provide a fully function control system for operating the dispenser 20 in the manner disclosed herein. It will be appreciated that various aspects of the dispensing unit control and functionality may be embodied in software, firmware, and/or hardware.

In one embodiment, the microcontroller 61 may include a timer which is preprogrammed to apply a voltage across the electrodes 52, 53 for a predetermined period of time after a single push and release of the actuator 42. This negates the need for the user to keep pressing or holding the actuator button while applying the oral care agent to the teeth or a whitening tray. The microcontroller 61 detects the activation of the actuator button (e.g. user depressing or rotating the button) via either electrical contacts closing or a force/displacement type sensor associated with the actuator 42 which is communicably interconnected to the microcontroller. An example of a displacement type sensor is a Hall-effect sensor. An example of a force type sensor is a thin film force sensor which detects pressure applied to the actuator 42 by the user when activated. Other types of sensors may be used and are not limited to forgoing examples.

In response to detecting an actuator signal, the microcontroller 61 energizes the electrical circuit 50 for the preprogrammed and predetermined period of time to apply a charge to the oral care agent "A" in the reservoir 26. As an example, the electrical circuit 50 may be energized for about 15 seconds in one embodiment which is generally sufficient to dispense and apply the oral care agent. After 15 seconds has passed, the microcontroller 61 terminates the electrical charge. If the user requires additional time, the actuator 42 may be activated again to begin another 15 second dispensing cycle. It bears noting that microcontroller 61 is also programmed to sense and activate the dispensing mechanism 40 concurrently with energizing the electrical circuit 50 upon detection that the user has activated the actuator 42. In other configurations of the microcontroller 61 software, the program instructions may direct the electrical circuit 50 to remain energized and the dispensing mechanism 40 to dispense the oral care agent only while the user maintains the actuator 42 in a depressed or rotated state. Releasing the actuator 42 in this setup with terminate the electrical charge and product dispensing. Accordingly, numerous dispenser control scenarios are possible using microcontroller 61.

According to another aspect and alternative embodiment of the present invention, the foregoing oral care agent dispenser may be modified to accommodate detachable mounting of interchangeable/replaceable chemistry/refill cartridges with dispensing tips. The chemical cartridges can hold a variety of different oral care agents, such as without limitation whitening agents, sensitivity relief agents, anti-bacterial agents, and others. Such an oral care agent dispenser 100 which creates a modular dispensing system is shown in FIGS. 3-17. The two-piece dispenser 100 includes a similar electrical system, electronics, and fluid dispensing system described above with respect to dispenser 20 and operates in the same basic manner to apply an electrical charge to the oral care agent when the actuator 42 is activated by the user.

Referring now to FIGS. 3-17, a hand-held oral care agent dispenser 100 generally includes a proximal powered base unit 102 containing the power supply/circuitry, electronics, and dispensing mechanism, and one or more replaceable chemical cartridges 120 detachably mountable to the distal end of the base unit. In the present design, however, the reservoir 26 is self-contained within the distally-mounted cartridge 120 with dispensing tip as further described below. This allows the user to continue using the same base unit 102 with different cartridges over time, whether they contain the same chemical agent (i.e. replacements) or different agents to treat other oral cavity conditions. To achieve this interchangeability, each of the chemical cartridges 120 have an identical mounting interface or features which mate with a common mounting interface or feature provided on the powered base unit 102 configured to provide a secure but detachable coupling described in greater detail below.

Powered base unit 102 is similar in part to dispenser 20 and has a housing 106 including a distal end 101 configured for coupling to cartridges 120, a proximal end 103 including actuator 42, and cylindrical sidewalls 104 extending longitudinally between the ends along longitudinal axis A-A. Base unit 102 has a generally tubular hollow body defining internal cavity 105 between the ends 101, 103 which houses the electronics (circuit board 60 with microcontroller 61), primary portion of the electrical circuit 50, dispensing mechanism 40, and power source 51 (e.g. battery).

In one embodiment, dispenser housing 106 may be two-piece in construction comprising a pair of longitudinal half-sections 106-1, 106-2 which may be detachably or permanently coupled together after mounting of the electronics, battery, dispensing mechanism 40, and other components therein. Any suitable detachable (e.g. ultrasonic welding, adhesives, etc.) or permanent (snap fit, fasteners, etc.) coupling methods may be used.

The dispensing mechanism 40 in the present dispenser 100 with interchangeable cartridges 120 may be a piston-operated ratchet type mechanism as shown. Piston 41 may have a generally U-shaped body in one non-limiting example including a distal piston head 142 and pair of opposing and laterally spaced apart proximal ratchet arms 143. This configuration avoids interference with the power source 50 (i.e. battery) which may be nested at least partially between the arms 143. This arrangement advantageously allows provision of a compact dispenser unit with minimal outer diameter. Ratchet arms 143 are elongated and extend axially along and parallel to longitudinal axis A-A from the head 142 towards the proximal end 103 of dispenser 100. Each ratchet arm includes a toothed rack 144 comprising a linear row or array of teeth. The toothed racks 144 each face radially outwards and are arranged to engage a respective mating index tooth 145 formed on actuator 42.

Actuator 42 may similarly have a U-shaped body including a cylindrical boss 149 defining an elongated proximal push button 146 and pair of index arms 147. This configuration similarly avoids interference with the power source 50 (battery) which may be advantageously nested at least partially between the arms 147 to support the compact construction of the dispenser unit. Button 146 may be generally cylindrical in shape and has a diameter smaller than boss 149 in one implementation. The button 146 protrudes through an axially open center hole 150 formed in an end wall 152 of the dispenser. In one embodiment, the end wall may be formed on a separate cap 151 coupled to the proximal end 103 of the dispenser 100, such as via an interlocked snap fit (shown), adhesives, threaded connection, or other. The cylindrical boss 149 has a diameter larger than center hole 150 to retain the actuator in the dispenser housing.

The actuator 42 is movable between an inactive extended state and an active depressed state pushed at least partially inwards inside the dispenser 100 housing. Actuator 42 may be biased by spring 148 towards the extended state. A coiled compression spring may be used in one embodiment for this purpose; however, other types of springs may be used. After the button 146 is depressed, the spring 148 returns it to the extended state ready for the next activation cycle. In the extended state, the cylindrical boss 149 abuttingly engages the end wall 152 of cap 151 as shown in the figures. The button 146 protrudes axially from the proximal end 103 of dispenser 100 for access by the user in a similar manner to that shown for dispenser 20. Actuator 42 may include an elongated spring retaining rod 156 for centering and holding spring 148 in place. Rod 156 is projectable distally through a hole 157 in a lateral partial partition wall 158 formed in the proximal end portion of dispenser housing 106 when the push button 146 is depressed (best shown in FIG. 11). Other spring mounting arrangements may be used.

Index arms 147 of actuator 42 are elongated and extend axially along and parallel to longitudinal axis A-A from the button 146 towards the distal end 101 of dispenser 100. Each index arm includes a radially inward facing index tooth 145 which engages a respective toothed rack 144 of piston 41 in an indexed manner each time the actuator button 146 is depressed by the user. Advantageously, the teeth of the toothed racks 144 are spaced axially apart by a distance selected to correspond with a predetermined volume of oral care agent desired to be dispensed with each push of the actuator 42.

In operation, depressing and pushing the actuator 42 in an axial distal direction will advance the piston 41 towards the distal end 101 of the powered base unit 102 via engagement between index teeth 145 on the index arms 147 and toothed racks 144 on the piston ratchet arms 143 to dispense the oral care agent, as further described herein. This mutual engagement of the index teeth and toothed racks further retains/holds the piston 41 in its axial-longitudinal position after the actuator button 146 is released. With each successive push of the actuator button, the index teeth 145 on actuator 42 gradually move back along the teeth on the toothed racks 144 from the distal ends of the toothed racks towards their proximal ends as the piston head 142 advances in the distal direction towards the dispensing end of the dispenser 100. The actuator 42 remains in the same relative position on the powered base unit 102 housing (except for the brief/temporary linear movement with each successive push of button 146).

In one embodiment, the proximal electrode 52 in the electrical circuit may be fixedly mounted to and directly supported by the piston head 142. Electrode 52 is therefore movable with the piston 41 as it advances distally within the powered base unit 102 each time the actuator 42 is activated by the user (e.g. pushed). Piston head 142 may be an elongated cylinder in shape in one embodiment. The proximal electrode 52 may a configured as a pin-like conical protrusion which protrudes in a distal direction from a flat distal face 153 of the piston head 142. The metallic electrode 52 is electrically connected to the battery (power source 51) by a suitable conductive lead 154 (e.g. wire or other).

Piston head 142 has a diameter selected to be received through the proximal end of the cylindrically-shaped reservoir 26 formed in the interchangeable cartridges 120. Distal face 153 of the piston head forms a movable proximal wall of the reservoir which advances in the distal direction towards the dispensing end each time the actuator 42 is activated. The proximal electrode 52 mounted to piston head 142 is thus embedded within and in direct electrical contact with the oral care agent in the reservoir 26 when the cartridge 120 is coupled to the base unit 102. To complete the electrical circuit through the oral care agent, the distal electrode 53 may be mounted inside the interchangeable cartridge 120. Electrode 53 is in electrical contact with dispensing conduit 27 formed in cartridge 120 upstream or adjacent to the discharge opening 28-1 for delivery of the oral care agent. The electrode 53 is positioned to apply an electrical charge to the oral care fluid being dispensed through the dispensing conduit 27. In one arrangement, electrode 53 may be embedded in a sidewall of the dispensing conduit 27 and exposed to the conduit such that passing oral care agent is directly exposed to and receives an electrical charge from the electrode. In another possible embodiment, the dispensing conduit 27 may be formed a metallic conductive tube to which the electrode 53 is attached. The electrode energizes the entire conduit and oral care agent flowing therethrough when being dispensed. Either of the foregoing arrangements may be used for electrode 53.

Because the distal electrode 53 is electrically connected to electric circuit 50 and power source 51 mounted in the detachable cartridge 120, while the proximal electrode 52 is mounted to the powered base unit 102, a pair of mating metallic electrical contacts 154-1, 154-2 (e.g. tabs, blocks, etc.) are provided to complete the electrical connection and circuit. Contact 154-1 is mounted in the distal end wall of the powered base unit 102 in a position which abuttingly contacts its paired contact 154-2 mounted in the proximal end wall of the chemical cartridge 120 when the two pieces are coupled together. Contact 154-1 is connected (electrically) to the circuit 50 and power source 51 by a conductive lead 154 in the base unit 102. Distal electrode 53 is connected to contact 154-2 via a conductive lead 154 in the cartridge 120. Other types of electrical contacts may be used in other embodiment and is not limiting of the invention.

In one embodiment, the cathodic electrode 53 may be formed of stainless steel and the piercing anodic electrode 52 may be formed of platinum-plated titanium as a non-limiting example. Other suitable metals may be used for forming the cathodic and anodic electrodes in other embodiments. The actuator 42 and piston 41 may be made of a non-conductive material such as a suitable plastic in one embodiment.

With continuing general reference to FIGS. 3-17, the interchangeable cartridges 120 are axially elongated assemblies comprising an outer mounting sleeve 121, inner reservoir insert 122 therein which defines reservoir 26, and dispensing tip portion 28 including the end discharge opening 28-1. Mounting sleeve 121 and reservoir insert 122 are generally tubular and cylindrical in shape in one embodiment. The sleeve and insert may be in contact along a majority of their lengths. Tip portion 28 has a distal mounting end configured for partial insertion into reservoir insert 122. Tip portion 28 has an axially elongated body which defines dispensing conduit 27. A proximal face 123 of tip portion 28 defines a stationary distal wall of reservoir 26, whereas the distal face of piston 41 defines the movable proximal wall of the reservoir as previously described herein. Dispensing conduit 27 is formed completely through tip portion 28 and extends from the distal discharge opening 28-1 to an opposite proximal opening into the reservoir for receiving oral care agent therefrom. The tip portion 28 may optionally be terminated with any of the applicators 29 previously described herein in one embodiment (e.g. chisel applicator or brush) to apply the oral care agent directly to the user's teeth surfaces. Alternatively, the nozzle form of applicator 29 may be used for applying the oral care agent to a plastic U-shaped whitening tray (now shown) cast/molded from an impression of the user's teeth. In such a design, the dispensing end applicator may be provided in the form of a non-porous frustoconical nozzle (see, e.g. FIG. 2). The dispensing conduit 27 which defines discharge opening 28-1 at its distal terminal end continues and extends through the nozzle. In other embodiments, the oral care agent may be dispensed from the discharge opening 28-1 of the dispensing conduit 28 without additional of an extra applicator such as the nozzle, chiseled applicator, or brush.

The outer sleeve 121, inner reservoir insert 122, and tip portion 28 may be formed of a suitable plastic in one embodiment and permanently joined together by any suitable technique, such as without limitation ultrasonic welding or adhesives as some non-limiting examples.

To provide complete interchangeability and detachable coupling to the powered base unit 102, the cartridges 120 each share a common mounting interface or feature which complements a mating and complementary configured mounting interface or feature on the distal end of the base unit 102. The outer sleeve 121 may provide the mounting interface for the cartridges 120. In one embodiment, sleeve 121 may include at least one mounting protrusion 124 which is received in an L-shaped mounting slot 125 formed on the distal end 101 of the power base unit 102. The mounting slot has a distally open end and a closed end. In use, the cartridge 120 is mounted to the base unit 102 by first axially inserting the mounting protrusion 124 into a longitudinal portion of the slot 125. The distal end of the base unit 102 may be received into a proximally opened recess in the outer sleeve 121. Once fully pushed onto the base unit to a maximum extent, the cartridge 120 is then twisted and rotated. The protrusion 124 then travels laterally and circumferentially through a lateral portion of slot 125 until it is seated against the closed end of the slot to lock the cartridge to the base unit. In other possible embodiments, a threaded coupling between the cartridges 120 and power base unit 102 may instead be used by providing mating threaded portions on the proximal end of the cartridge sleeve 121 (e.g. internal threads) and distal end of the base unit (e.g. external threads). Yet other types of detachably couplings may be used in other embodiments.

Prior to assembling a new or fresh chemical cartridge 120 assembly to the powered base unit 102, a frangible and proximally-located seal such as sealing wall 127 may temporarily close the otherwise open rear end of the reservoir 26 in the cartridge. The frangible sealing wall 127 keeps the oral care agent in the reservoir and protects it from contamination or degradation during shipping and handling before the user assembles the oral care agent dispenser 100. The sealing wall 127 is constructed with a sufficient thinness and of a material which can be readily penetrated and punctured by the pointed proximal electrode 52 on base unit 102 previously described herein. In some examples, without limitation, sealing wall 127 may formed of a suitable metallic foil or polymeric material membrane. In use, the user couples the cartridge 120 to the powered base unit 102 in the manner described above (e.g. rotatable coupling). In the process, the electrode 52 on the base unit 102 punctures/pierces the frangible sealing wall as the piston head 142 is inserted through the rear end of the reservoir 26. The dispenser 100 is now ready for use.

Dispenser 100 may also include an optional venting system to allow gases generated by the electrochemical reaction in the reservoir 26 to be vented to atmosphere, while retaining the oral care fluid. The venting system may be similar to distal and proximal vents 30, 31 for dispenser 20 described above. In another embodiment, the distal wall or face 153 of the piston head 142 may be formed a gas-permeable membrane filter such as PTFE. Because the face 153 of the piston is in direct contact with oral care agent in reservoir 26, any accumulating gas is vented through the gas permeable version of face 153 into the internal cavity 105 of dispenser 100 behind the piston head 142. An open vent 155 is formed in the dispenser housing 106 to atmosphere to vent the escaping gas. In yet other embodiments, the venting system may be omitted entirely from dispenser 100 since the reservoir 26 is located within the chemical cartridge 120 in proximity to the dispensing conduit 27 and discharge opening 28-1. In some situations, this may be sufficient to vent any accumulating gases from the reservoir.

A process or method for assembling and using a modular oral care agent dispenser 100 with interchangeable chemical cartridges 120 generally includes the following steps. A powered base unit 102 and at least one chemical cartridge 120 is provided. In this example, the common mounting interface includes rotary type coupling features (e.g. protrusion/slot arrangement or threaded previously described herein) on the base unit and cartridge. In some embodiments, a plurality of cartridges may be provided (i.e. an oral care kit) and the user selects one of the cartridges for attachment to the base unit. The cartridge 120 may then first be axially aligned with the base unit 102 generally along the longitudinal axis A-A. Cartridge 120 is moved towards the base unit 102 and pushed against the base unit. The temporary frangible sealing wall 127 on the proximal end of the cartridge 120 is pierced and punctured by the distally protruding proximal electrode 52 on the base unit 102. A distal portion of the piston 41 (i.e. piston head 142) is inserted partially into the now opened proximal end of the reservoir 26 in the cartridge 120 containing the oral care fluid. The cartridge 120 is rotated until engagement between the cartridge and the base unit 102 is fully tightened. This completes the coupling between the cartridge and base unit in a leak tight manner.

The modular dispenser 100 is used in the same manner and steps described above with respect to dispenser 20. After dispenser 100 is fully assembled according to the method described above, the user activates the actuator 42 which simultaneously applies an electrical charge to the oral care fluid in the reservoir of the chemical cartridge 120 and dispenses the oral care fluid from the distal dispensing end (discharge opening 28-1) of the cartridge. The oral care fluid may be directly applied to the oral surfaces (e.g. teeth and/or gums) via applicator 29 if provided, or alternatively to a dental tray if a nozzle form of the applicator is provided instead.

Numerous variations of the foregoing components in the modular dispensing system may be made. For example, in some embodiments, both proximal and distal electrodes 52, 53 may be disposed in the cartridge in which electrode 52 is in direct contact with the oral care fluid in the reservoir and electrode 53 is in direct contact with the oral care fluid in the dispensing conduit 27. In some embodiments, the power source 51 may be disposed in the cartridge 120 rather than base unit 102.

It will be understood that while the invention has been described in conjunction with specific embodiments thereof, the foregoing description and examples are intended to illustrate, but not limit the scope of the invention. Other aspects, advantages and modifications will be apparent to those skilled in the art to which the invention pertains, and these aspects and modifications are within the scope of the invention and described and claimed herein.

What is claimed is:

1. An oral care implement comprising:
    a housing comprising a reservoir storing an oral care fluid and a dispensing conduit terminating in a discharge opening, the dispensing conduit fluidly coupled to the reservoir for delivering the oral care fluid from the reservoir to the discharge opening;
    a power source;
    a first electrode operably coupled to the power source, the first electrode located within the reservoir of the housing and being electrically coupled to the oral care fluid located in the reservoir;
    a second electrode operably coupled to the power source, the second electrode located within the dispensing conduit of the housing and being electrically coupled to the oral care fluid as the oral care fluid passes through the dispensing conduit towards the discharge opening; and
    an actuator operably coupled to an electrical circuit and configured to energize the first and second electrodes upon being actuated, thereby generating an electrical charge at the second electrode to which the oral care fluid in the dispensing conduit is exposed prior to being discharged through the discharge opening.

2. The oral care implement according to claim 1, wherein the actuator is further configured to dispense the oral care fluid from the reservoir via the discharge opening upon being actuated.

3. The oral care implement according to claim 1, wherein the second electrode is positioned adjacent the discharge opening, and wherein the electrical charge generated by the second electrode creates a localized change in a pH of the oral care fluid that is limited to the oral care fluid in the dispensing conduit.

4. The oral care implement according to claim 1, wherein the oral care fluid is a tooth whitening fluid, a pH of the tooth whitening fluid located within the dispensing conduit increasing upon the electrical charge being generated at the second electrode.

5. The oral care implement according to claim 4, wherein the pH of the tooth whitening fluid in the reservoir is about 5.5 and the pH of the tooth whitening fluid exiting the dispensing conduit is at least 10.

6. The oral care implement according to claim 1, wherein each of the first and second electrodes is in direct contact with the oral care fluid.

7. The oral care implement according to claim 1, wherein the first electrode moves within the reservoir as the oral care fluid is dispensed to maintain the first electrode in contact with the oral care fluid that remains in the reservoir.

8. The oral care implement according to claim 1, further comprising a venting system including a distal vent located in a distal portion of the housing and in fluid communication with a distal portion of the reservoir, and a proximal vent located in a proximal portion of the reservoir near the piston, the distal and proximal vents operable to vent gas accumulating in the reservoir to atmosphere, and wherein the distal and proximal vents are formed from hydrophobic gas-permeable membrane filters.

9. The oral care implement according to claim 1, wherein actuating the actuator closes an electrical contact to energize the first and second electrodes while simultaneously dispensing the oral care fluid from the reservoir to the discharge opening.

10. The oral care implement according to claim 1, wherein the second electrode is disposed proximate to the discharge opening in the dispensing conduit.

11. The oral care implement according to claim 1, further comprising a microcontroller operably coupled to the power source and the actuator, the microcontroller configured to (1) energize the first and second electrodes for a preprogrammed period of time upon detection that the actuator has been activated by a user, and (2) de-energize the first and second electrodes after the period of time has expired.

12. The oral care implement according to claim 1 wherein the housing comprises a main portion that includes the reservoir and a dispensing portion that includes the dispensing conduit, the dispensing portion having a smaller cross-sectional area than the main portion, and wherein the first electrode is located within the main portion and the second electrode is located within the dispensing portion.

13. The oral care implement according to claim 1 wherein the second electrode is located upstream of the discharge opening.

14. A modular dispenser for dispensing an oral care agent, the modular dispenser comprising:
    a cartridge comprising:
        a reservoir containing an oral care fluid; and
        a dispensing conduit fluidly coupled to the reservoir for delivering the oral care fluid to a discharge opening, the dispensing conduit comprising a first electrode;
    a base unit detachably coupled to the cartridge, the base unit comprising:
        a power source operably coupled to the first electrode when the base unit is coupled to the cartridge;
        a dispensing mechanism; and an actuator that, when actuated, delivers the oral care fluid from the reservoir to the dispensing conduit for dispensing through the discharge opening;

a second electrode operably coupled to the power source and positioned in contact with the oral care fluid in the reservoir; and wherein during delivery of the oral care fluid from the reservoir to the dispensing conduit, the first and second electrodes are energized to generate an electric charge at the second electrode to which the oral care fluid in the dispensing conduit is exposed.

15. The modular dispenser according to claim 14, wherein the base unit comprises the second electrode.

16. The modular dispenser according to claim 15, wherein the second electrode projects from a distal end of the base unit into the reservoir so that the second electrode is in contact with the oral care fluid in the reservoir when the base unit and the cartridge are attached.

17. The modular dispenser according to claim 14, wherein the cartridge comprises the second electrode.

18. The modular dispenser according to claim 14, wherein the oral care fluid is a tooth whitening fluid, and wherein a pH of the tooth whitening fluid increases as the tooth whitening fluid passes through the dispensing conduit while the first and second electrodes are energized.

19. The modular dispenser according to claim 14, wherein the cartridge includes an inner reservoir insert and an outer sleeve surrounding the inner reservoir insert, the outer sleeve configured to rotatably engage the base unit to detachably couple the cartridge thereto.

20. The modular dispenser according to claim 14, wherein the cartridge comprises a proximal end having a first electrical contact that is operably coupled to the first electrode and wherein the base unit comprises a distal end having a second electrical contact that is operably coupled to the power source, and wherein when the cartridge is coupled to the base unit the first and second electrical contacts are in contact with one another to operably couple the first electrode in the cartridge to the power source in the base unit.

* * * * *